US012657509B2

(12) United States Patent
Routt et al.

(10) Patent No.: US 12,657,509 B2
(45) Date of Patent: Jun. 16, 2026

(54) QUANTUM ARTIFICIAL INTELLIGENCE AND MACHINE LEARNING IN A NEXT GENERATION MOBILE NETWORK

(71) Applicants: AT&T Intellectual Property I, L.P., Atlanta, GA (US); AT&T Mobility II LLC, Atlanta, GA (US)

(72) Inventors: Thomas J. Routt, Sequim, WA (US); Mark Stockert, San Antonio, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 1036 days.

(21) Appl. No.: 17/498,248

(22) Filed: Oct. 11, 2021

(65) Prior Publication Data

US 2023/0110591 A1 Apr. 13, 2023

(51) Int. Cl.
| | |
|---|---|
| *G06N 20/00* | (2019.01) |
| *G06F 15/16* | (2006.01) |
| *G06N 10/00* | (2022.01) |
| *H04L 9/08* | (2006.01) |

(52) U.S. Cl.
CPC ............. *G06N 20/00* (2019.01); *G06F 15/16* (2013.01); *G06N 10/00* (2019.01); *H04L 9/0858* (2013.01)

(58) Field of Classification Search
CPC .............................. G06N 10/00; H04L 9/0858
See application file for complete search history.

(56) References Cited

U.S. PATENT DOCUMENTS

| | | | | |
|---|---|---|---|---|
| 7,451,292 | B2 | 11/2008 | Routt | |
| 8,190,553 | B2 | 5/2012 | Routt | |
| 10,817,337 | B1 * | 10/2020 | Richardson | ........... G06F 9/5005 |
| 10,965,777 | B2 | 3/2021 | Stockert et al. | |
| 2021/0168031 | A1 | 6/2021 | Stockert et al. | |
| 2023/0027344 | A1 * | 1/2023 | Kaubruegger | ......... G06N 10/40 |

OTHER PUBLICATIONS

Nawaz, Syed Junaid, et al. "Quantum machine learning for 6G communication networks: State-of-the-art and vision for the future." IEEE access 7 (2019): 46317-46350. (Year: 2019).*

(Continued)

*Primary Examiner* — Kevin W Figueroa
(74) *Attorney, Agent, or Firm* — Guntin & Gust, PLC; Louis Yang

(57) ABSTRACT

Aspects of the subject disclosure may include, for example, a method of receiving, by a quantum processing system including a hybrid quantum-classical processor, qubits from one or more quantum communication channels by the quantum processor or hybrid quantum-classical processor, wherein each quantum processor or hybrid quantum-classical processor is physically distinct, and wherein the one or more quantum communications channels utilize quantum channel coding and quantum error detection; performing, by the quantum processing system, quantum logic operations on the qubits; and utilizing a plurality of end-to-end quantum and hybrid quantum-classical networked application resources to implement quantum artificial intelligence (QAI) and/or quantum machine learning (QML) services. Other embodiments are disclosed.

20 Claims, 9 Drawing Sheets

(56)               References Cited

OTHER PUBLICATIONS

Ramírez, José Gabriel Carrasco. "Integrating AI and NISQ technologies for enhanced mobile network optimization." Quarterly Journal of Emerging Technologies and Innovations 5.1 (2020): 11-22. (Year: 2020).*

"Entanglement sent over 50 km of optical fiber", https://www.sciencedaily.com/releases/2019/08/190829150732.htm, University of Innsbruck, Aug. 29, 2019, 4 pgs.

Gidney, "How to factor 2048 bit RSA integers in 8 hours using 20 million noisy qubits", Accepted in Quantum Mar. 29, 2021, click title to verify. Published under CC-BY 4.0. arXiv:1905.09749v3 [quant-ph] Apr. 13, 2021, Apr. 13, 2021, 31 pgs.

Grover, Lov K., "Quantum Mechanics helps in searching for a needle in a haystack", Physical Review Letters, 79(2), 325 (1997)., 1997, 4 pgs.

Shor, Peter W., "Polynomial-Time Algorithms for Prime Factorization and Discrete Logarithms on a Quantum Computer", Siam Review c 1999 Society for Industrial and Applied Mathematics vol. 41, No. 2, pp. 303-332, Apr. 23, 1999, 30 pgs.

* cited by examiner

230

300

600

QUANTUM ARTIFICIAL INTELLIGENCE AND MACHINE LEARNING IN A NEXT GENERATION MOBILE NETWORK

FIELD OF THE DISCLOSURE

The subject disclosure relates to Quantum Artificial Intelligence (QAI) and Quantum Machine Learning (QML) in a next generation mobile network.

BACKGROUND

Machine learning (ML) is a hybrid branch of Artificial Intelligence (AI) and statistics that generally refers to patterns that are derived ('learned') from input data, in which machines learn, perform, and improve their operations by exploiting data-informed knowledge. Classical (non-quantum) machine learning (CML) is used to a great extent to categorize data instances into classes that are either user-defined or derived from the intrinsic structure of data. CML can be utilized for example, to power big data analytics to realize predictive/prescriptive, proactively optimized, self-sustaining public safety mobile networks. See U.S. Pat. Nos. 10,244,581; 10,660,157; 10,827,561 and U.S. Pat. Pub. No. 2021/0022211, entitled "Public Safety Analytics Gateway."

CML algorithms are generally distinguished into supervised, unsupervised, and Reinforced Learning (RL) categories. Supervised classical learning utilizes pre-defined sets of training data (labeled datasets) containing data points previously interrogated, to produce a set of classifications where the CML algorithm optimizes internal parameters until close classification of the training set has been attained.

Unsupervised classical learning invokes a clustering algorithm (i.e., k-means) which can split input data into distinct clusters for later classification. RL has no training set but instead inputs data classification results into an unmarked dataset as either correct or incorrect, which is then iterated through the algorithm, resulting in a learning process.

CML is traditionally directed to classical (non-quantum) data sources but will be increasingly required to operate on data originating from quantum computational sources, a requirement that inexorably generates intractable runtimes due to exceeding polynomial time calculation thresholds against quantum computational data sources, because classical computation processing performs tasks in a serial fashion.

In contrast, quantum computation pursues all computational trajectories simultaneously based on quantum superposition. Quantum computation stores information as quantum bits (qubits) which are quantum generalizations of classical bits. Qubits can be represented as a $2^n$ level quantum system based on, for example, electronic/photonic spin and polarization, where:

The state of a qubit is a phase vector $|\psi\rangle$ (mathematical description of a quantum system, a complex-valued probability amplitude and the probabilities for possible results of measurements made on the system) in a linear superposition of states such as $|\psi\rangle = \alpha|0\rangle + \beta|1\rangle$;

State vectors $|0\rangle$ and $|1\rangle$ are physical eigenstates of the logical observable, and form a computational basis spanning a two-to-n dimensional Hilbert space (inner product space of two or more vectors, equal to the vector inner product between two or more matrix representations of those vectors) containing $|\psi\rangle$;

And where a collection of qubits comprises a multiparticle quantum system.

Quantum logic gates form basic quantum circuits that operate on qubits, and unlike classical logic gates, are reversible (with a few exceptions). Quantum logic gates are unitary operators, described as unitary matrices relative to basis states. Quantum algorithms utilize quantum circuit gates to manipulate states of quantum systems just as classical algorithms utilize classical logical gates (represented as a sequence of Boolean gates) to perform classical (non-quantum) computational operations.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for implementing Quantum Artificial Intelligence (QAI) and Quantum Machine Learning (QML) in a communications network. Other embodiments are described in the subject disclosure.

One or more aspects of the subject disclosure include a communications network having one or more quantum communication channels; a processing system including quantum processors or hybrid quantum-classical processors; and a memory that stores executable instructions that, when executed by the processing system, facilitate performance of operations, the operations comprising: transmitting and receiving qubits across the one or more quantum communication channels between the quantum processors or hybrid quantum-classical processors, wherein each quantum processor or hybrid quantum-classical processor is physically distinct, and wherein the one or more quantum communications channels utilize quantum channel coding and quantum error detection; performing quantum logic operations on the qubits; and utilizing a plurality of end-to-end quantum and hybrid quantum-classical networked application resources to implement quantum artificial intelligence (QAI) and/or quantum machine learning (QML) services.

One or more aspects of the subject disclosure include a non-transitory, machine-readable medium, comprising executable instructions that, when executed by a processing system including a quantum processors or a hybrid quantum-classical processor, facilitate performance of operations including receiving qubits from one or more quantum communication channels by the quantum processor or hybrid quantum-classical processor, wherein each quantum processor or hybrid quantum-classical processor is physically distinct, and wherein the one or more quantum communications channels utilize quantum channel coding and quantum error detection; performing quantum logic operations on the qubits; and utilizing a plurality of end-to-end quantum and hybrid quantum-classical networked application resources to implement quantum artificial intelligence (QAI) and/or quantum machine learning (QML) services.

One or more aspects of the subject disclosure include a method of receiving, by a quantum processing system including a hybrid quantum-classical processor, qubits from one or more quantum communication channels by the quantum processor or hybrid quantum-classical processor, wherein each quantum processor or hybrid quantum-classical processor is physically distinct, and wherein the one or more quantum communications channels utilize quantum channel coding and quantum error detection; performing, by the quantum processing system, quantum logic operations on the qubits; and utilizing a plurality of end-to-end quantum and hybrid quantum-classical networked application resources to implement quantum artificial intelligence (QAI) and/or quantum machine learning (QML) services.

Figure 1:
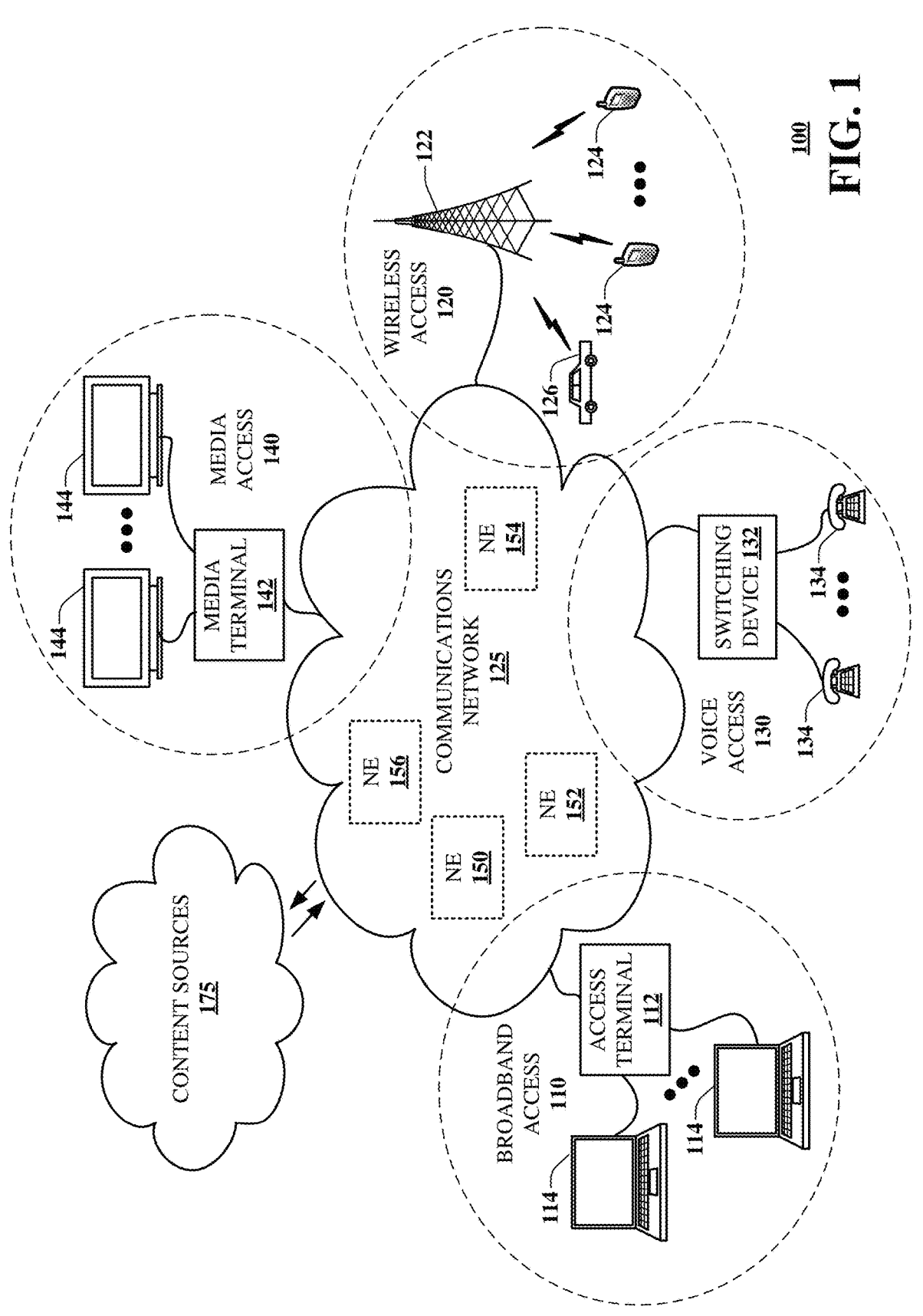
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. For example, system 100 can facilitate in whole or in part classical communications supporting transmitting and receiving qubits across the one or more quantum communication channels between the quantum processors or hybrid quantum-classical processors. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Mobile network technology evolution informs pre-standards for development of sixth generation (6G) standards in the International Telecommunication Union (ITU) international mobile technology (IMT), Standards Developing Organizations (SDOs), and third generation partnership project (3GPP). Requirements under consideration include on-demand topology; three-dimensional (3D) connectivity; integration of communications and sensing technologies; ultra-high-speed, high-capacity, low-latency connectivity; and on-demand artificial intelligence (AI). 6G mobile networks are projected to provide an increase of ~100 times in volumetric spectral and energy efficiency (bps/Hz/m3) relative to fifth generation (5G) networks. 6G networks are projected to incorporate a massive connectivity-based structure.

Figure 2A:
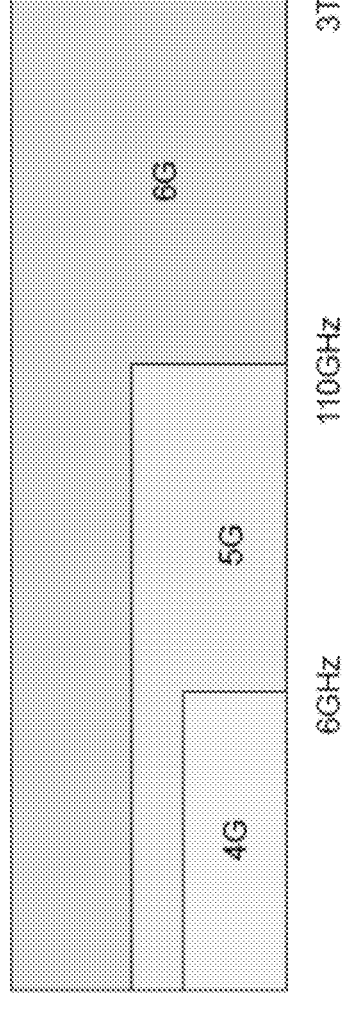
FIG. 2A is a block diagram illustrating representative ranges of 4G, 5G and projected 6G mobile spectrum deployed by system 200, in accordance with various aspects described herein.

FIG. 2A is a block diagram illustrating representative ranges of 4G, 5G and projected 6G mobile spectrum deployed by system 200, in accordance with various aspects described herein. As shown in FIG. 2A, ranges of 4G, 5G [sub-6 GHz (Sub6 mmW)], and projected 6G (>100 GHz-to-multi-THz)] mobile network spectra illustrates a requirement for 6G spectra to co-exist with 5G Sub6, 5G mmW, and 4G LTE bands/spectra.

Emerging quantum networks are based on quantum communication channels that transmit qubits between physically distinct quantum or hybrid quantum-classical processors that can perform quantum logic operations on qubits. Quantum Artificial Intelligence (QAI)-based Quantum Machine Learning (QML) can be run against pure quantum, pure classical, and/or hybrid quantum/classical computational runtime environments. QML has advantages over classical machine learning (CML) that include:

QML operates within a $2^n$-dimensional Hilbert space, an exponential computational resource not accessible by CML;

Quantum computation provides a degree of parallelism not available in classical computation;

Data-driven learning coupled with quantum computing methods are uniquely positioned to realize a service-driven, fully intelligent mobile network environment;

QML achieves faster processing relative to CML derived in part from invocation for example, of Grover's quantum factoring, Shor's quantum search, or Routt's quantum search/quantum-classical cryptosystem algorithms. See Grover, L. "Quantum Mechanics Helps in Searching for a Needle in a Haystack," Physical Review Letters, 79(2), 325 (1997); Shor, P. W., "Polynomial-Time Algorithms for Prime Factorization and Discrete Logarithms on a Quantum Computer," SIAM Journal on Computing, 26(5), 1484 (1997); U.S. Pat. Nos. 7,451,292 and 8,190,553.

Figure 2B:
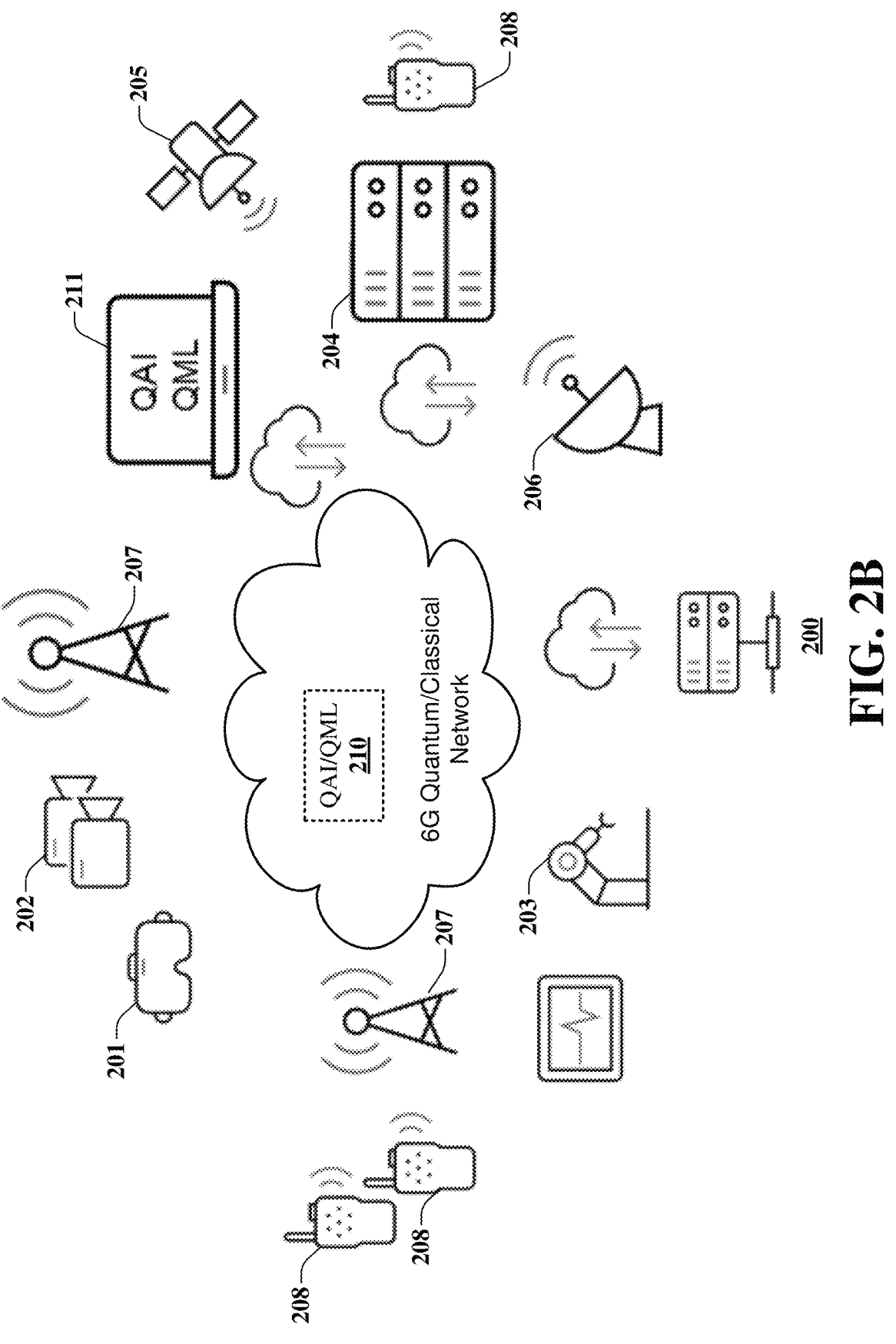
FIG. 2B is a block diagram illustrating an example, non-limiting embodiment of a communication network system providing on-demand QAI and QML services in accordance with various aspects described herein.

FIG. 2B is a block diagram illustrating an example, non-limiting embodiment of a communication network system providing on-demand QAI and QML services in accordance with various aspects described herein. As shown in FIG. 2B, system 200 provides very high bandwidth quantum/classical network enabling communications for a multitude of devices such as high-fidelity holographic devices 201, cameras 202, robots 203, wireless data centers 204, satellites 205 and ground transceivers 206, radio access networks 207 and hand-held devices 208 using a plurality of sub-GHz, multi-GHz, Sub-THz, and multi-THz frequencies, and sub-Gbps, multi-Gbps, sub-Tbps, and multi-Tbps uplink/downlink (UL/DL) speeds. System 200 includes quantum channel coding and quantum error detection and can be applied to fixed terrestrial and wireless quantum communications.

System 200 provides very wide coverage to support massively scaling Internet of Things (IoT) networks with sub-Gbps-to-multi-Gbps-to-Tbps coverage everywhere within proximal and remote areas. Whereas 5G minimum reliability requirements include successful transmission of a 32-byte layer 2 (L2) packet within 1 ms at $1-10^5$ and "four-to-five 9s" (99.99% to 99.999%) availability, certain 6G applications such as remote robotic haptic surgery, digital twins (virtualization model of a physical process, product or service; pairing of the virtual and physical worlds to enable monitoring/data analysis to predict performance and anticipate problems before they occur), tactile/haptic communications, government/national security, first responder/emergency services, etc., will require reliability and redundancy that range upward from four9s/five 9s. Features of system 200 include:

High endpoint density incorporating for example, from 10 million devices/km$^2$ to 1 billion or more devices/m$^2$ driving requirements for Quantum AI 210, 211 to continuously optimize in real time among apparently competing scheduling, beam/link adaptation, and interference coordination/mitigation resources.

Hyper-synchronization of multiple, parallel flows to multiple devices supporting synchronized parallel media streams that originate from a plurality of network endpoints and midpoints.

Extremely low power consumption for resource-constrained devices.

Time-sensitive operations (i.e., bounded latency, jitter).

Ubiquitous services (land, air, space, sea) based on a seamlessly integrated connectivity architecture consisting for example, of land-, sea-, air-, and space-based nodes. Includes 'z' axis added to 2D surface-based (x-y axes) routing/switching infrastructures.

6G mobile networks will increasingly require quantum and hybrid quantum-classical communications to interconnect a plurality of end-to-end (ETE) quantum and hybrid quantum-classical networked application resources, i.e., application programs, application programming interfaces (APIs), application servers, security servers, data repositories/lakes, routers, switches, load balancers, links, etc.

In an embodiment, system 200 would utilize optical quantum networks to enable low-loss transmission of quantum states between/among quantum and/or classical network nodes. System 200 implements quantum optical communications based on non-intrusive photonic polarization modulation and control, where the optical carrier retrieves the phase information. System 200 retains quantum properties with high fidelity, where photonic entanglement would be conveyed for example, via distinguished optical spectra into smaller slots then assigning arbitrarily sized blocks of spectrum on demand. In an embodiment, quantum photonic communication utilizing quantum channels will overlay classical communication channels in hybrid quantum-classical networks.

In an embodiment, system 200 would utilize electronic quantum networks.

In an embodiment, system 200 would utilize opto-electronic quantum networks.

In an embodiment, system 200 would utilize hybrid quantum-classical optical, electronic, and/or opto-electronic networks.

Quantum data generated by quantum and hybrid quantum-classical computational runtime environments are characterized by quantum superposition and quantum entanglement, and yield n-dimensional probability distributions that require exponential compute resources to process, represent, store, and connect. The presence of quantum/hybrid or quantum/classical end-to-end (ETE) networked application resources in turn, exponentiates requirements to incorporate QAI, QML and Quantum Deep Learning (QDL) within 6G mobile and fixed communications networks.

In an embodiment, system 200 provides a massively parallel QAI/QML architecture across a plurality of time, space, and frequency domains. As shown in FIG. 2B, QAI/QML 210 resides in the core network elements of system 200, or QAI/QML 211 may be in network edge elements of system 200. In an embodiment, system 200 provides highly distributed QAI/QML/QDL at the network edge directed to minimizing target server/application/database access latency, and to alleviating backhaul congestion issues by deploying computation and storage resources at edge nodes. Representative use cases include 6G mobile networks supporting IoT, high bandwidth devices (i.e., video cameras), and/or very large data sets. Placing large data sets at the network edge reduces requirements to transport these data sets to centralized locations, requiring intelligent processing at the edge where QAI can be directed to extract actionable patterns/events from raw data. QAI/QML 210, 211 provides massive data-driven ETE networking of mobile wireless and fixed systems.

In an embodiment, system 200 provides highly distributed QAI/QML/QDL in radio access network (RAN) elements 207. System 200 would replace a plurality of Layer 1/Layer 2 protocols/algorithms that include preamble detection, channel estimation, equalization and user scheduling based on performance improvements.

In another embodiment, system 200 provides a massively parallel QDL architecture across a plurality of time, space, and frequency domains, comprising a multi-layered structure through which to connect, collect, store, and execute actionable predictive/prescriptive data analytics. System 200 dynamically and prescriptively optimizes spectrum resources [ranging from <6 GHz (Sub6) low band/mid band, to millimeter wave (mmW) high band (i.e., ≥24 GHz), to multi-THz spectra] through a multi-layered QDL architecture, massive-scale data analytics, and energy detection algorithms.

In an embodiment, system 200 distributed operations would be governed by Quantum Random Number Generators (QRNGs) that are effectively invulnerable to prediction or bias present in classical (non-Quantum) pseudorandom number generators (PRNGs), effectively avoiding security algorithmic determinism and predictability.

In an embodiment, system 200 is applied to zero trust physical and logical ETE systems to ensure secure communications utilizing for example: (1) Quantum cryptosystems; (2) Hybrid Quantum-Classical cryptosystems; (3) Hybrid Classical-Quantum cryptosystems. Secure quantum networking would be achieved for example, via use of Quantum Key Distribution (QKD) employing transmission of quantum photonic states between user sets such that a shared secret key is established. QKD incorporates the quantum states of particles—i.e., photons—to construct stings of zeros and ones. Any eavesdropping between sender and receiver changes the string or key and is detected immediately. Long transmission distance [i.e., Quantum Wide Area Network (Q-WAN)] maintenance of QKD secure key rate and prevention of transmission distance-sensitive quantum coherence loss would be achieved for example, via trusted relay quantum sub-networks, and would be accomplished over a plurality of terrestrial fiber networks and ground-to-satellite links.

In an embodiment, operation of system 200 is temporally governed by a quantum network of atomic clocks enabling for example, quantum networking connections between and among a plurality of atomic clocks via quantum teleportation and quantum entanglement between and among a plurality of Quantum Network Time Protocol (QNTP)-based Stratum servers with the objective to enable quantum network clocking precision that meets or exceeds the Standard Quantum Limit (SQL) to temporally govern generation, transmission, transduction, interfacing, storage, processing, and measurement of optical and/or electronic qubits. The SQL is used for example, in interferometry and for any linear measurement of a quantum mechanical observable that does not commute with itself at different times, i.e., run afoul of the Heisenberg uncertainty principle.

In an embodiment, system 200 would enable quantum entanglement-based quantum teleportation of a plurality of quantum states.

In an embodiment, system 200 would be provided via quantum encoding, enabling both quantum and classical communications to be simultaneously transmitted over quantum communication channels.

In an embodiment, system 200 would operate within a distributed quantum networking environment interconnecting for example, Quantum Wide Area Networks (Q-WANs), Quantum Metropolitan Area Networks (Q-MANs), Quantum Local Area Networks (Q-LANs), Quantum Storage Area Networks (Q-SANs), resulting in exponential (rather than linear) macrosystem processing density matrices as compared to classically networked WANs, LANs, SANs.

In an embodiment, system 200 would operate within a fully service-based cloud computing environment where network functions would be dynamically scheduled across a plurality of data centers to continuously optimize available and predicted compute resources, network resources, latency requirements, and bandwidth requirements.

In an embodiment, system 200 enables distributed 6G/QAI/QML communications via Superconducting Quantum Interference Devices (SQUIDs) based on Josephson junctions and would maintain quantum superposition and quantum entanglement based on high-temperature superconductivity quantum coherence, where a quantum superposition state (i.e., 0+π) is established over a plurality of local and wide transmission distances via distinct charge superpositions.

In an embodiment, system 200 enables communications by quantum entanglement distribution networks where entangled states represent the underlying network resources, based for example, on entangled Bell state pairs, quantum channels, entanglement swapping, and entanglement distribution networks.

In an embodiment, system 200 enables distributed 6G/QAI/QML via quantum stabilizer codes that mitigate decoherence effects in quantum circuits.

In an embodiment, system 200 provides partially- or fully-immersive user experiences, to include virtual reality (VR, i.e., computer-generated stereo visuals that surround the user, entirely replacing the physical world), augmented reality (AR, i.e., overlay of digitally created content on top of the physical world), mixed reality (MR, i.e., blending of VR/AR-based physical environment, extended reality (XR, i.e., using varying combinations of VR/AR/MR), and digitally-created content to enable coexistence/interaction, and 3-dimensional (3D) holographic images between/among one-to-one, one-to-many, many-to-one, and many-to-many endpoints in an interactive manner. Holographic communications enable fully immersive user experiences virtually, where a key component is the interactive transmission of 3D holographic images between/among one/multiple sources to one/multiple endpoints.

Other use cases include health care where for example, MR could be employed to view/manipulate patient medical information in various settings, and/or to treat patients remotely. Precise location tracking would enable for example, precise location/tracking of user devices, vehicles, and tracking along six degrees of freedom for VR/AR/MR and holographic communications tracking including the three dimensions of spatial movement along x-y-z axes, plus pitch, yaw and rotation.

In an embodiment, system 200 enables a tactile Internet as an evolution of the IoT that incorporates human-to-machine and machine-to-machine real-time interactive communications. The tactile Internet enables for example, remote robotic surgery with haptic robots. System 200 incorporates machine-to-machine and human-to-machine interactions. Use cases include for example: (1) Remote surgery utilizing haptic-enabled robots and real-time feedback; (2) Remote, real-time monitoring and control of industrial machinery, including cyber/physical systems/manufacturing that integrate the digital world and real world, where intelligent objects interconnect and interact; (3) Smartdust, where a system of multiple micro-electromechanical system (MEMS) such as sensors and robots, that can detect vibration, light, temperature, magnetism, chemicals; (4) Quantum Electromechanical System (QEMS) where nano-fabricated mechanical systems that incorporate transducers operating at the quantum limit (limit on measurement accuracy at quantum scales) to detect for example, magnetic moment of a single spin and deformation forces on a single macromolecule, with applications directed to information and biomolecular technologies; and (5) Dynamically allocated, integrated connectivity logical/physical network architecture incorporating terrestrial fixed/wireless, submarine, airborne, and/or space-based assets (i.e., LEO satellites 205).

In an embodiment, system 200 interconnects quantum sensors in massive IoT quantum network environments via quantum-entangled correlations would be established across dynamically network-sliced arrays of sensors, i.e., interstate highways, airports, physical/digital critical infrastructure.

Hence, quantum computing and quantum networking solutions incorporated in system 200 assume strategic importance due to:

Continuing cost-performance improvements in classical (non-quantum) processor memory, speed, and VLSI substrate density packing are not sustainable due to quantum effects that pervade the quantum scales at which electronic and photonic processors, devices, and network components are fabricated and process data;

Worldwide quantity of data volume (scale), variety (form, structured/unstructured), velocity (streaming) and veracity (uncertainty) is soaring inexorably due to exponential improvements in computing, storage, cloud, and mobility network economies of scale and specialization. While the Internet and World Wide Web have changed how the world communicates, 'Big Data' are transforming how information itself is processed in the following ways:

Previous reliance upon collecting and using relatively small sample sizes has shifted to emphasis on collecting and storing vast quantities of information in cloud-based data lakes/repositories;

Highly curated data need to be provided against exponential increases in available information.

In another embodiment, system 200 would be directed to FirstNet and Public Safety quantum and quantum-classical mobile networks within a plurality of use cases to include, for example: (1) prescriptively optimize in real time a plurality of ETE mobile network logical and physical resources to dynamically allocate, re-allocate, configure, and re-configure virtual network elements based on local-, regional-, or national-level natural or manmade disaster scenarios; (2) minimize access latency, maximize throughput, maximize network resiliency; (3) guarantee first responder priority access and disallow preemption once on the network; (4) dynamically generate Smart Maps with multi-layer image overlays; (5) dynamically shift network traffic to respond to overload conditions. Such ubiquitous first responder/emergency services directed to highly available, reliable, resilient, ubiquitous, network-agnostic communications frameworks provide high degrees of data, video, voice, graphical and image integration, address on-demand temporal coverage, network redundancy, in-building solutions, location-centric on-demand capacity, and provide support for mission critical, push-to-talk (MC-PTT), MC-data, MC-video (MC-X). System 200 incorporates remotely controlled and autonomous assets such as connected vehicles, drones, robots within an emergency services architecture.

Figure 2C:
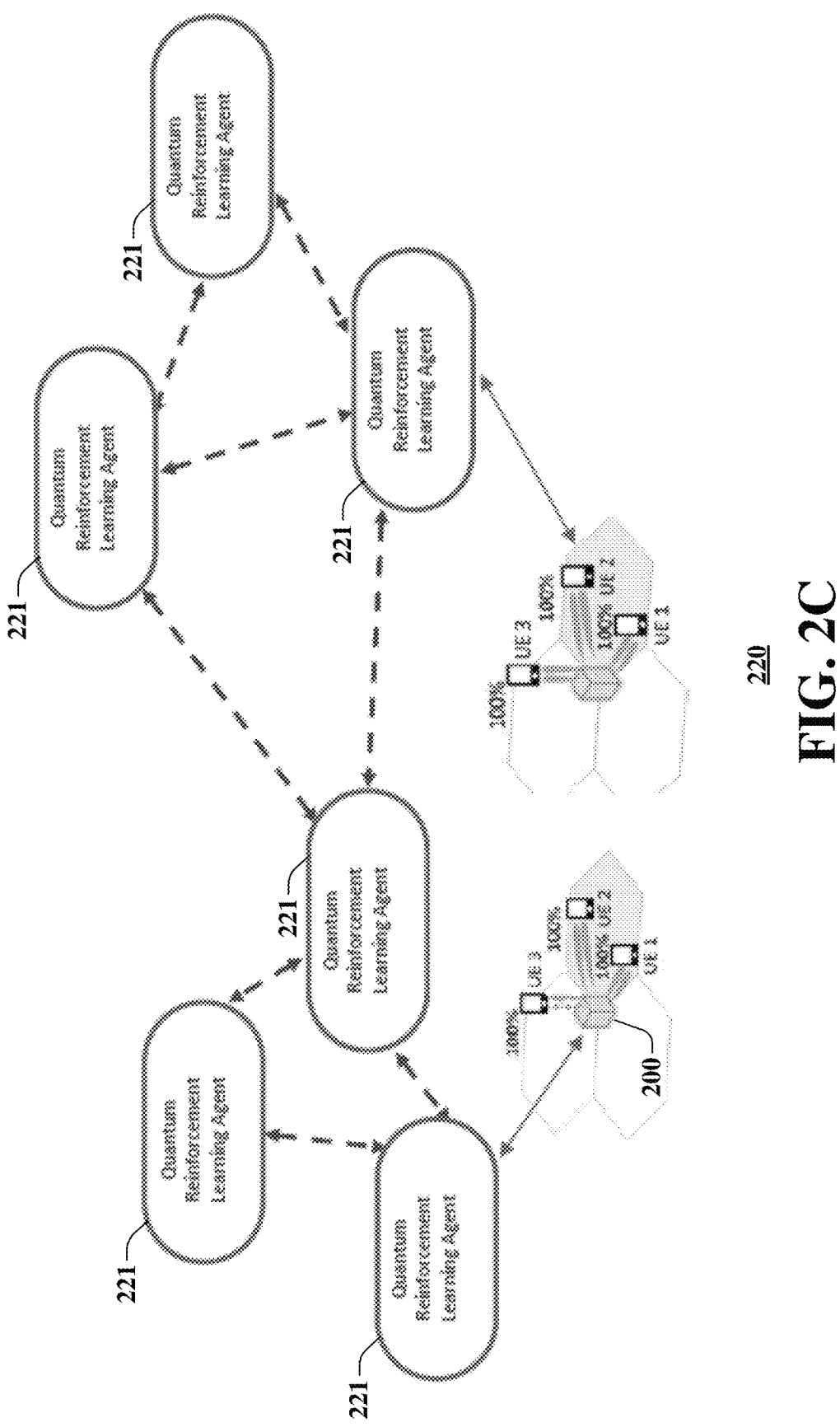
FIG. 2C is a block diagram illustrating a network 220 of quantum reinforcement learning agents that manage complexity, scalability, and optimizes resource usage, in accordance with various aspects described herein.

FIG. 2C is a block diagram illustrating a network 220 of Quantum Reinforcement Learning (QRL) agents that manage complexity, scalability, and optimizes resource usage, in accordance with various aspects described herein. As shown in FIG. 2C, QRL agents 221 are software/hardware entities that instantiate autonomous or semi-autonomous control functions into quantum, classical, and hybrid quantum-classical networks of system 200. The QRL agents 221 combine RL control elements with quantum network elements (i.e., quantum channels, quantum memory, quantum logic gates, etc.). Networked QRL agents 221 can be modeled in terms of control loops (local and global) with self-monitoring, self-adjustment, knowledge, and planner/adapters to apply to policies based on awareness of the distributed processing environment.

In an embodiment, system 200 would learn, perform, and improve QAI/QML/QDL and Quantum Reinforcement Learning (QRL) operations by exploiting data-driven operational, tactical, and strategic knowledge and experience provided by quantum, hybrid quantum-classical, and classical computation platforms and runtime environments, within supervised, semi-supervised, unsupervised, and reinforcement learning architectures. Networked QRL agents 221 predict future mobility patterns, end device locations, device association, manage spectrum resources (i.e., channel quality, admission control, handover optimization, path loss, shadow fading), and optimize traffic (i.e., number of devices/elements per unit area). QRL agents 221 dynamically and prescriptively optimize for example, radio channel quality based on quantum superposition, quantum entanglement, and massively parallel multi-dimensional processing of radio identification, channel tracking, routing, and switching. System 200 provides quantum speedup for QRL agents 221 based on an environment paradigm utilizing quantum superposition and parallelism to identify eigenstates, where the probability of a given eigen action is determined by probability amplitudes that inform decision boundaries.

Figure 2D:
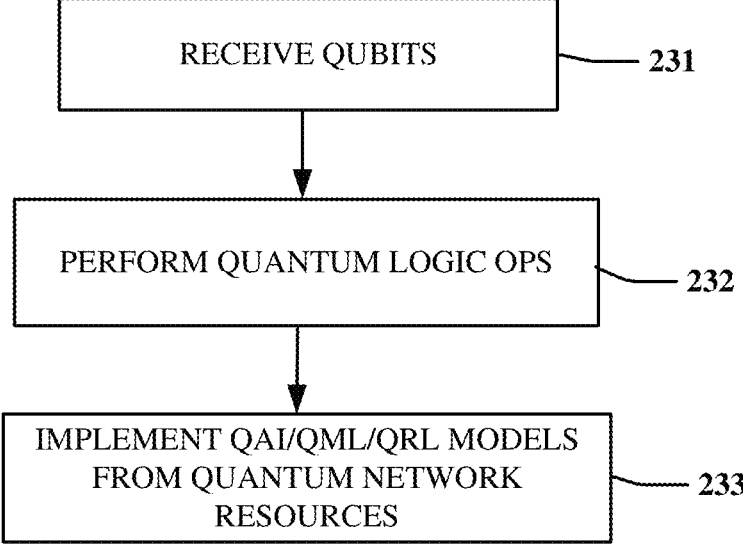
FIG. 2D depicts an illustrative embodiment of a method in accordance with various aspects described herein.

FIG. 2D depicts an illustrative embodiment of a method in accordance with various aspects described herein. The method 230 begins in step 231 where a quantum processing system including a hybrid quantum-classical processor receives qubits from one or more quantum communication channels from other quantum processors or hybrid quantum-classical processors. Quantum processors or hybrid quantum-classical processors coupled to the one or more quantum communication channels are physically distinct from one another. During the communication of the qubits, the one or more quantum communications channels utilize quantum channel coding and quantum error detection to ensure accuracy.

Next, in step 232, the quantum processing system performs quantum logic operations on the qubits. Next, in step 233, the quantum processor uses a plurality of end-to-end quantum and hybrid quantum-classical networked application resources to implement quantum artificial intelligence (QAI), quantum machine learning (QML), and quantum resource learning (QRL) models to provide quantum network services.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
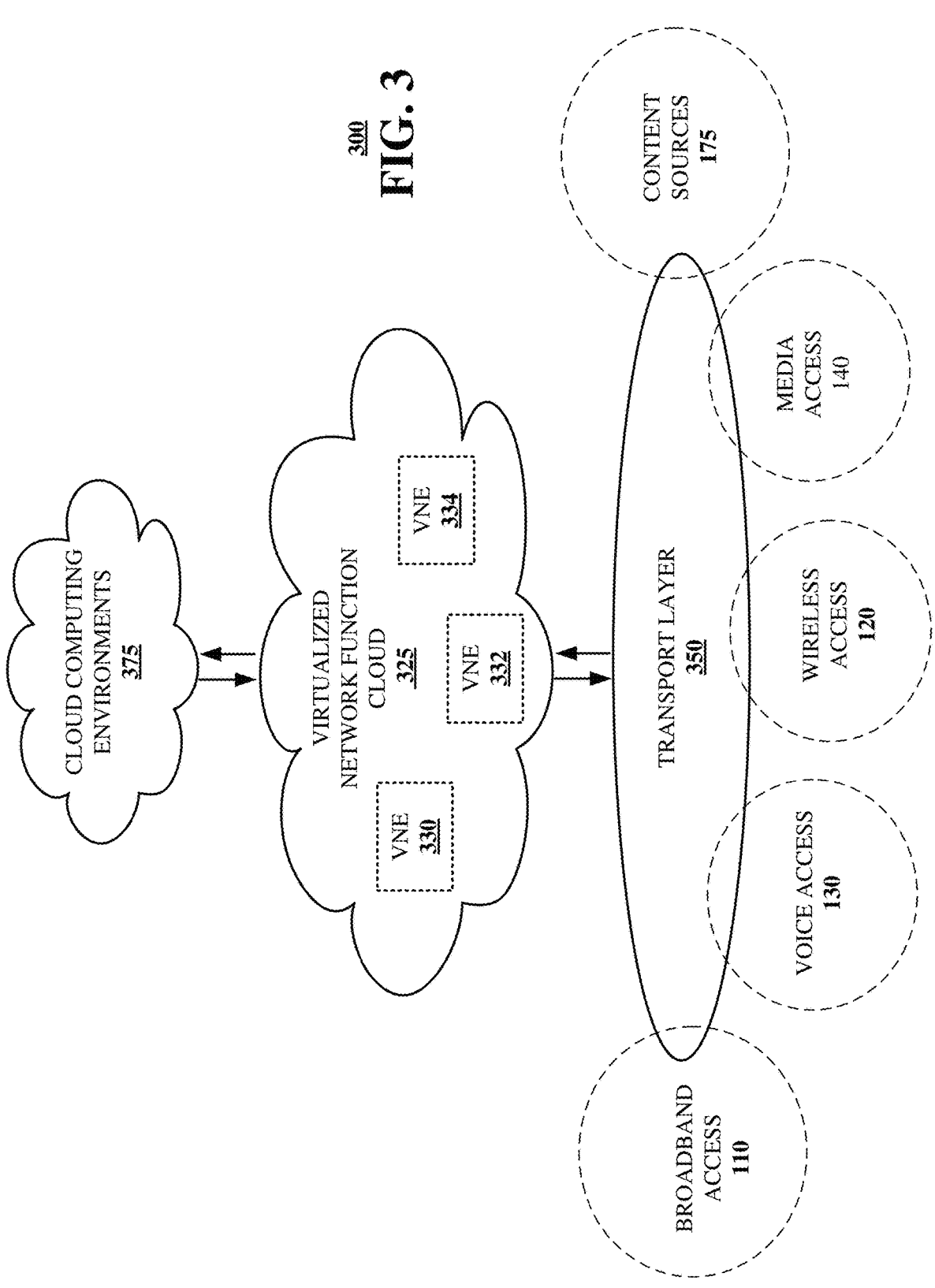
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular, a virtualized communication network is presented that can be used to implement some or all of the subsystems and functions of system 100, the subsystems and functions of system 200, and method 230 presented in FIGS. 1, 2A, 2B, 2C, and 3. For example, virtualized communication network 300 can facilitate in whole or in part utilizing a plurality of end-to-end quantum and hybrid quantum-classical networked application resources to implement quantum artificial intelligence (QAI) and/or quantum machine learning (QML) services.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function—the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, satellite, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributors and other network elements. Because these elements don't typically need to forward large amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
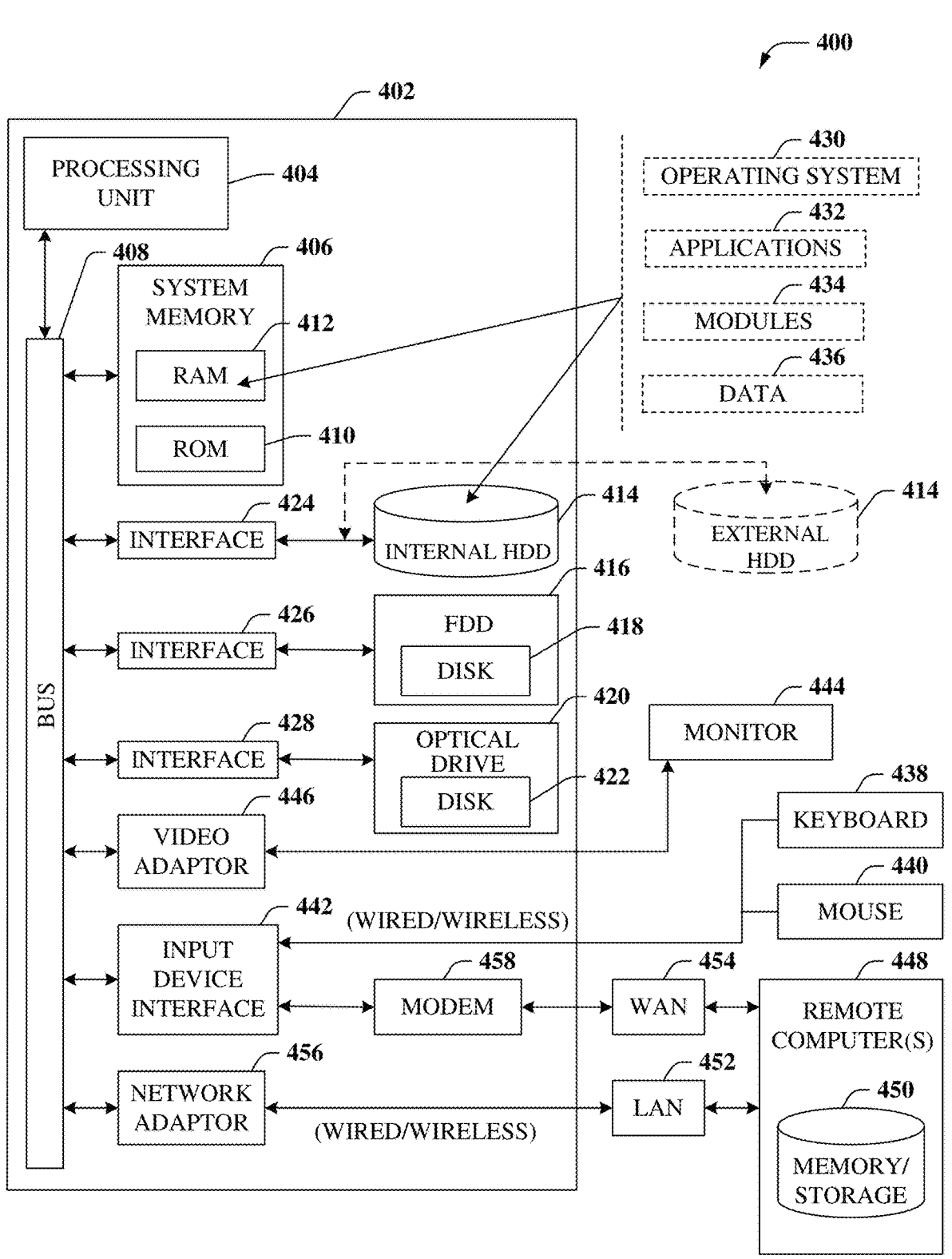
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part utilizing a plurality of end-toend quantum and hybrid quantum-classical networked application resources to implement quantum artificial intelligence (QAI) and/or quantum machine learning (QML) services.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
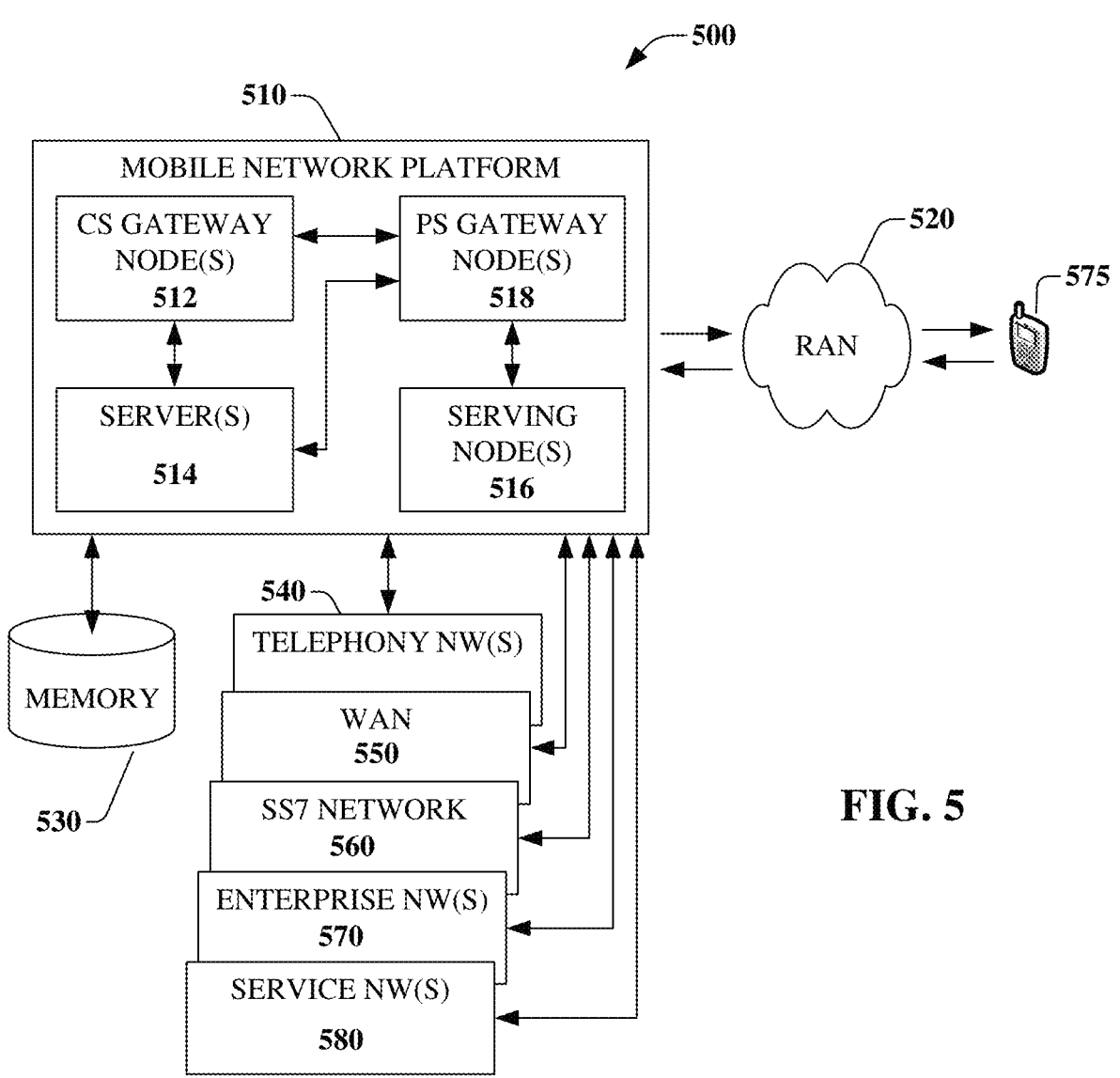
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part utilizing a plurality of end-to-end quantum and hybrid quantum-classical networked application resources to implement quantum artificial intelligence (QAI) and/or quantum machine learning (QML) services. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM) and circuit-switched (CS) traffic (i.e., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
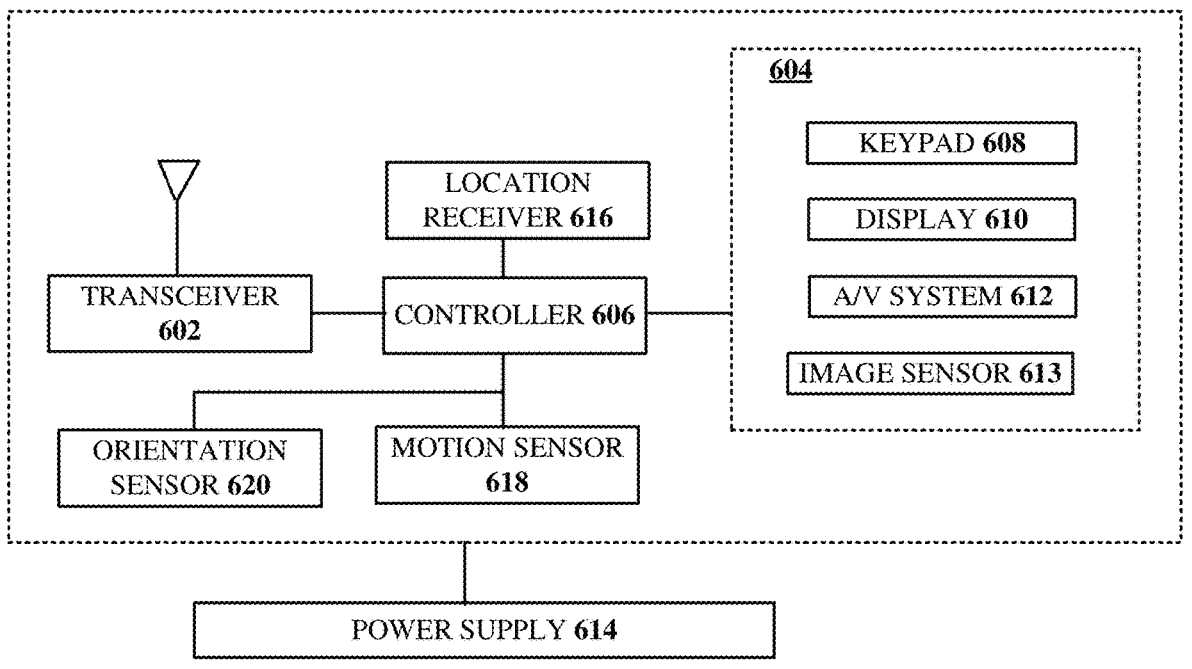
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part utilizing a plurality of end-to-end quantum and hybrid quantum-classical networked application resources to implement quantum artificial intelligence (QAI) and/or quantum machine learning (QML) services.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., Naïve Bayes (which assumes independence between features and assigns the same weight/degree of significance to all features within given data sets), Bayesian networks, decision trees, neural networks, fuzzy logic models, k-nearest neighbor and probabilistic classification models providing different patterns of independence can be employed. "Classification" as used herein also is inclusive of statistical regression that is utilized to develop models of priority. One or more embodiments can employ ensemble learning that combines multiple learning methods to improve predictive performance and accuracy.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A communications network, comprising:
one or more quantum communication channels;
a processing system including quantum processors or hybrid quantum-classical processors; and
a memory that stores executable instructions that, when executed by the processing system, facilitate performance of operations, the operations comprising:

transmitting and receiving qubits across the one or more quantum communication channels between the quantum processors or hybrid quantum-classical processors, wherein each quantum processor or hybrid quantum-classical processor is physically distinct, and wherein the one or more quantum communication channels utilize quantum channel coding and quantum error detection;

performing quantum logic operations on the qubits; and utilizing a plurality of end-to-end quantum and hybrid quantum-classical networked application resources to implement quantum artificial intelligence (QAI) and/or quantum machine learning (QML) services, wherein the plurality of end-to-end quantum and hybrid quantum-classical networked application resources facilitate optimization of traffic with respect to optimizing a quantity derived by calculating a number of devices per unit area, and wherein the plurality of end-to-end quantum and hybrid quantum-classical networked application resources are distributed across a plurality of edge radio access network (RAN) elements of the communications network.

2. The communications network of claim 1, wherein the QAI and/or QML services are implemented across a plurality of time, space, and frequency domains.

3. The communications network of claim 1, wherein the plurality of end-to-end quantum and hybrid quantum-classical networked application resources comprise application programs, application programming interfaces (APIs), application servers, security servers, data repositories/lakes, routers, switches, load balancers, links, or a combination thereof.

4. The communications network of claim 1, wherein the QAI and/or QML services are implemented in core network elements of the communications network.

5. The communications network of claim 1, wherein the QAI and/or QML services are distributed in a radio access network of the communications network.

6. The communications network of claim 1, wherein the operations further comprise: utilizing the plurality of end-to-end quantum and hybrid quantum-classical networked application resources to implement a hybrid quantum-classical cryptosystem.

7. The communications network of claim 6, wherein the hybrid quantum-classical cryptosystem includes transmission of quantum key distribution over the one or more quantum communication channels.

8. The communications network of claim 1, wherein the operations further comprise utilizing the plurality of end-to-end quantum and hybrid quantum-classical networked application resources to implement a quantum network of atomic clocks.

9. The communications network of claim 8, wherein the quantum network of atomic clocks enable quantum network clocking precision that meets or exceeds a Standard Quantum Limit.

10. The communications network of claim 1, wherein the plurality of end-to-end quantum and hybrid quantum-classical networked application resources are configured to replace perform at least one of the following Layer 1 or Layer 2 functions: preamble detection, channel estimation, equalization, or user scheduling.

11. A non-transitory, machine-readable medium, comprising executable instructions that, when executed by a processing system including a quantum processor or a hybrid quantum-classical processor, facilitate performance of operations, the operations comprising:

receiving qubits from one or more quantum communication channels by the quantum processor or hybrid quantum-classical processor, wherein each quantum processor or hybrid quantum-classical processor is physically distinct, and wherein the one or more quantum communication channels utilize quantum channel coding and quantum error detection;

performing quantum logic operations on the qubits; and utilizing a plurality of end-to-end quantum and hybrid quantum-classical networked application resources to implement quantum artificial intelligence (QAI) and/or quantum machine learning (QML) services, wherein the plurality of end-to-end quantum and hybrid quantum-classical networked application resources facilitate optimization of traffic with respect to optimizing a quantity derived by calculating a number of elements per unit area, and wherein the plurality of end-to-end quantum and hybrid quantum-classical networked application resources are distributed across a plurality of edge radio access network (RAN) elements of a communications network.

12. The non-transitory, machine-readable medium of claim 11, wherein the QAI and/or QML services are implemented across a plurality of time, space, and frequency domains.

13. The non-transitory, machine-readable medium of claim 11, wherein the plurality of end-to-end quantum and hybrid quantum-classical networked application resources comprise application programs, application programming interfaces (APIs), application servers, security servers, data repositories/lakes, routers, switches, load balancers, links, or a combination thereof.

14. The non-transitory, machine-readable medium of claim 11, wherein the operations further comprise: utilizing the plurality of end-to-end quantum and hybrid quantum-classical networked application resources to implement a hybrid quantum-classical cryptosystem.

15. The non-transitory, machine-readable medium of claim 14, wherein the hybrid quantum-classical cryptosystem includes transmission of quantum key distribution over the one or more quantum communication channels.

16. The non-transitory, machine-readable medium of claim 11, wherein the processing system comprises a plurality of quantum processors and/or hybrid quantum-classical processors distributed in core network elements or radio access network elements of the communications network.

17. A method, comprising:

receiving, by a quantum processing system including a hybrid quantum-classical processor, qubits from one or more quantum communication channels by the hybrid quantum-classical processor, wherein each hybrid quantum-classical processor coupled to the one or more quantum communication channels is physically distinct, and wherein the one or more quantum communication channels utilize quantum channel coding and quantum error detection;

performing, by the quantum processing system, quantum logic operations on the qubits; and utilizing a plurality of end-to-end quantum and hybrid quantum-classical networked application resources to implement quantum artificial intelligence (QAI) and/or quantum machine learning (QML) services, wherein the plurality of end-to-end quantum and hybrid quantum-classical networked application resources facilitate handover optimization and wherein the plurality of end-to-end quantum and hybrid quantum-classical networked application resources are distributed across a plurality of edge radio access network (RAN) elements of a communications network.

18. The method of claim 17, wherein the plurality of end-to-end quantum and hybrid quantum-classical networked application resources comprise application programs, application programming interfaces (APIs), application servers, security servers, data repositories/lakes, routers, switches, load balancers, links, or a combination thereof.

19. The method of claim 18, wherein the method further comprises: utilizing the plurality of end-to-end quantum and hybrid quantum-classical networked application resources to implement a hybrid quantum-classical cryptosystem.

20. The method of claim 19, wherein the hybrid quantum-classical cryptosystem includes transmission of quantum key distribution over the one or more quantum communication channels.

* * * * *